United States Patent [19]

Trotel et al.

[11] 3,843,916

[45] Oct. 22, 1974

[54] MOTOR CONTROL FOR THE PRODUCTION OF MASKS FOR SUBMINIATURISED CIRCUITS

[75] Inventors: Jacques Trotel; Georges Guillot; Bernard Fay, all of Paris, France

[73] Assignee: Thomson-CSF, Paris, France

[22] Filed: July 6, 1972

[21] Appl. No.: 269,421

[30] Foreign Application Priority Data

July 16, 1971 France ............................ 71.26188

[52] U.S. Cl. ................. 318/640, 318/587, 318/578, 250/49.5 T, 250/49.5 DE, 356/106

[51] Int. Cl. .............................................. G05b 1/06

[58] Field of Search .................... 318/587, 640, 578; 250/49.5 T, 49.5 TE

[56] References Cited

UNITED STATES PATENTS

| | | | |
|---|---|---|---|
| 3,429,155 | 2/1969 | Hines | 318/687 X |
| 3,457,422 | 7/1969 | Rottmann | 318/640 X |
| 3,466,514 | 9/1969 | Brunner et al. | 318/640 X |
| 3,473,157 | 10/1969 | Little et al. | 318/687 X |
| 3,622,856 | 11/1971 | Willis | 318/640 |
| 3,679,497 | 7/1972 | Handy et al. | 250/49.5 TE |
| 3,692,413 | 9/1972 | Marcy et al. | 318/577 X |
| 3,710,101 | 1/1973 | O'Keeffe et al. | 250/49.5 T |

*Primary Examiner*—T. E. Lynch
*Attorney, Agent, or Firm*—Cushman, Darby & Cushman

[57] ABSTRACT

An electronic apparatus for the mass production of masks for integrated circuits, comprises a master mask arranged in an evacuated chamber. In response to diffuse ultra-violet radiation, it emits from its transparent areas electrons which are focussed by uniform electric and magnetic fields which are parallel to one another. The master mask is positioned in relation to the wafer being printed, by means of piezoelectric elements which receive supply voltage increments produced following the illumination of two pairs of markers respectively arranged on the master mask and the wafer.

9 Claims, 17 Drawing Figures

MOTOR CONTROL FOR THE PRODUCTION OF MASKS FOR SUBMINIATURISED CIRCUITS

Electronic sub-miniature circuits, of planar type, integrated or otherwise, are manufactured on one face of a minute chip cut from a semiconductor monocrystal. They are produced by successive processes of photoengraving. These photoengraving or photo-etching steps require highly accurate positioning of several successive masks whose number can vary from 2 to 10 or even more.

The manufacture of elements of this kind is a large-scale one. Several elements, sometimes several hundreds, are manufactured simultaneously on one and the same wafer. Once manufacture has been completed, the elements are cut from the wafer and are then available separately.

The operations involved require extreme accuracy. In particular, the masks which are used must all be identical and have an absolute accuracy in the order of one-tenth of a micron. Their manufacture is carried out in two stages.

a. The manufacture of a master mask with the requisite absolute accuracy, by known electron-optical technique with which the invention is not concerned.

b. The reproduction of as many copies of said master having the same accuracy thereas, as there are elements to be simultaneously manufactured.

The object of the invention is a device which enables this latter problem to be resolved with extremely high accuracy and relative simplicity.

Devices of this kind are well known. They utilize master masks drawn on a quartz wafer in the following manner:

The quartz wafer is covered on one of its faces with a thin titanium film and then with a photoresist resin film sensitive to electron bombardment. Following the recording of the image, the resin is etched in the zones where the drawing has been formed. It is thus dissolved and the titanium is exposed at these zones. photoengraving or ion machining eliminates the exposed titanium. The remaining resin is then eliminated. The resultant assembly is then subjected to a heat-treatment which converts the remaining titanium to titanium oxide. The whole face is then covered with a palladium film. However, those skilled in the art will appreciate that titanium oxide is opaque to diffuse ultra-violet radiations, that quartz is transparent to these radiations and, finally, that palladium emits electrons when exposed to such radiation.

Under these circumstances, if these photons or electrons can be appropriately focussed, then the image of the master mask can be projected onto a plate which is sensitive to electron bombardment, for example a wafer. It is known to utilise, for this purpose, the combined action of an electric field and a magnetic field both of which are uniform and parallel to one another. The problem consists in positioning the wafer which is to be printed, with high accuracy in relation to the master mask which in the known devices, is fixed. The first step is to position the centre of the wafer at a precise point; then, the wafer must be rotated about this point to bring it into the required position. Thse operations are not generally carried out by mechanical means in the known devices. Auxiliary coils are used to alter the configuration of the magnetic field in order to displace the mask image and bring it to be the precise desired position of the wafer being printed, but this gives rise to aberrations.

The device in accordance with the invention, which utilises the same physical phenomena for the manufacture of the master mask, enables a more simple procedure to be adopted, whilst avoiding any aberrations.

The essential characteristics of this device are on the one hand that the magnetic field in the evacuated enclosure is uniform, that its direction is constant throughout all the operations, and that electrically controlled mechanical means are provided, the wafer to be printed having been placed in a predetermined position, in order to move the master mask into a position such that the image is reproduced in accordance with the required orientation in position on the wafer.

The invention will be better understood from a consideration of the ensuing description and by reference to the attached drawings in which:

FIG. 3 provides a perspective view of the same elements and of the electromechanical device associated with the master mask;

FIG. 4 is an explanatory diagram;

FIGS. 5, 6 and 7 are respective sectional views of indexation marks and their associated circuits;

Figure 8:
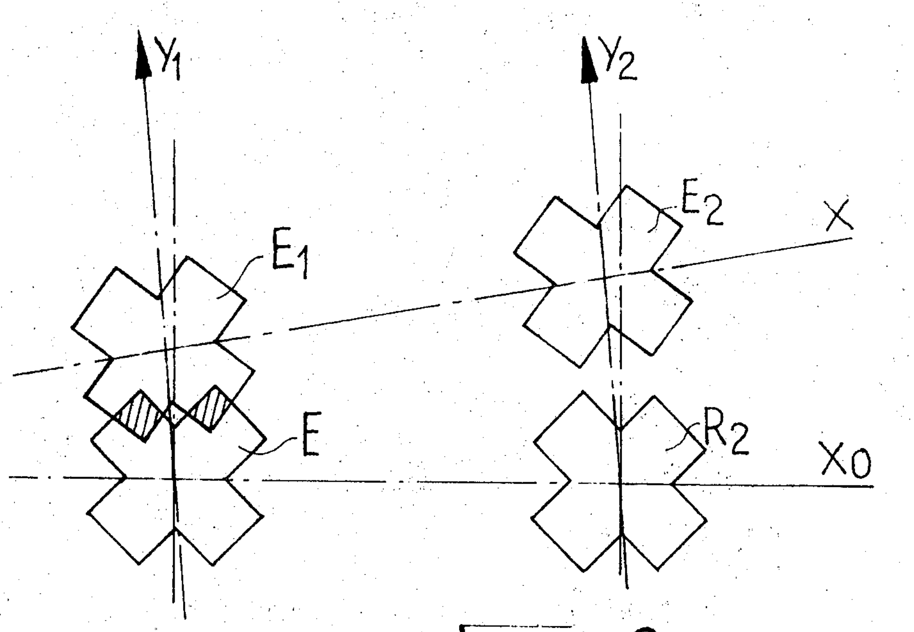
Figure 9:
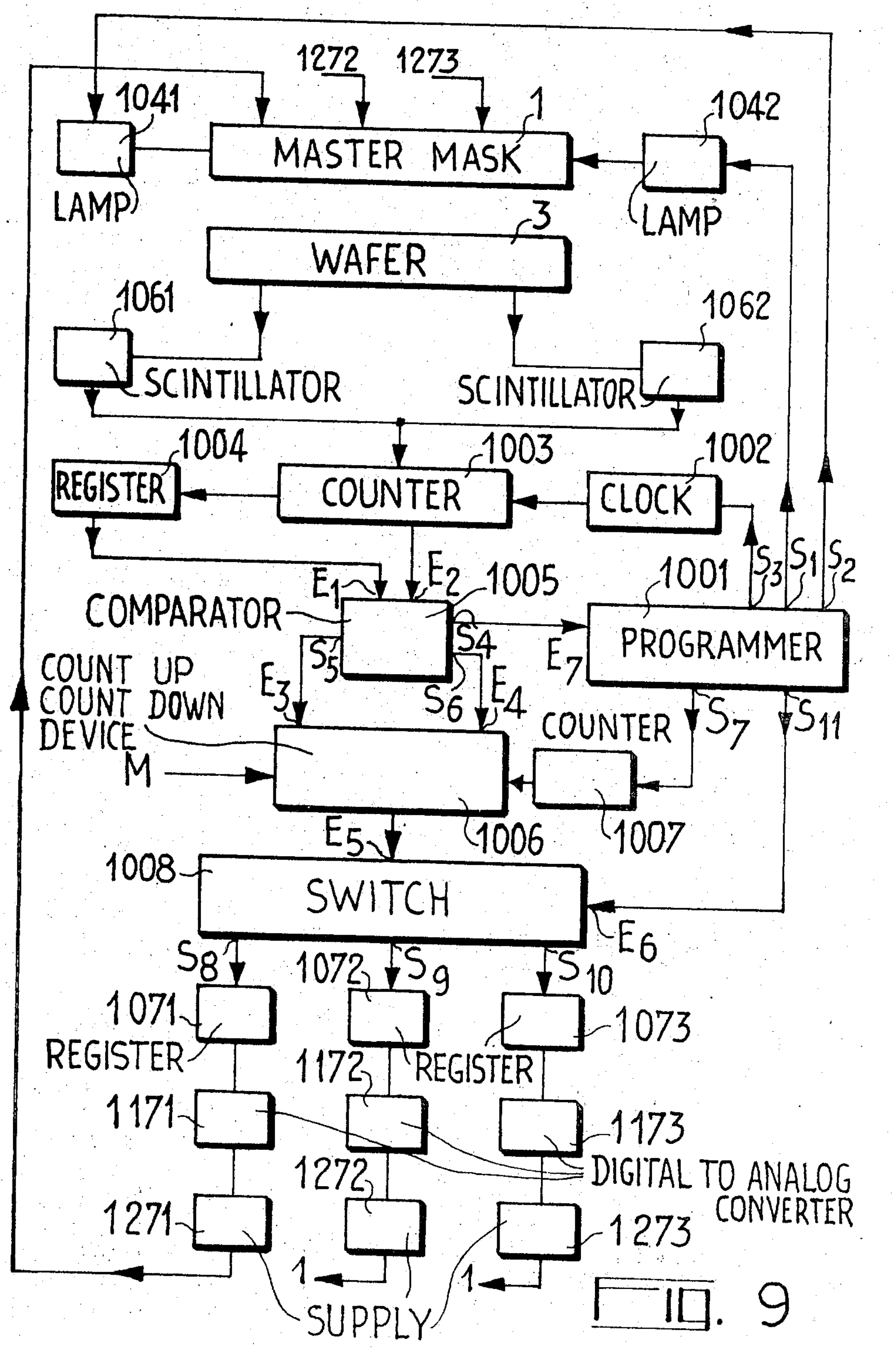
Figure 10:
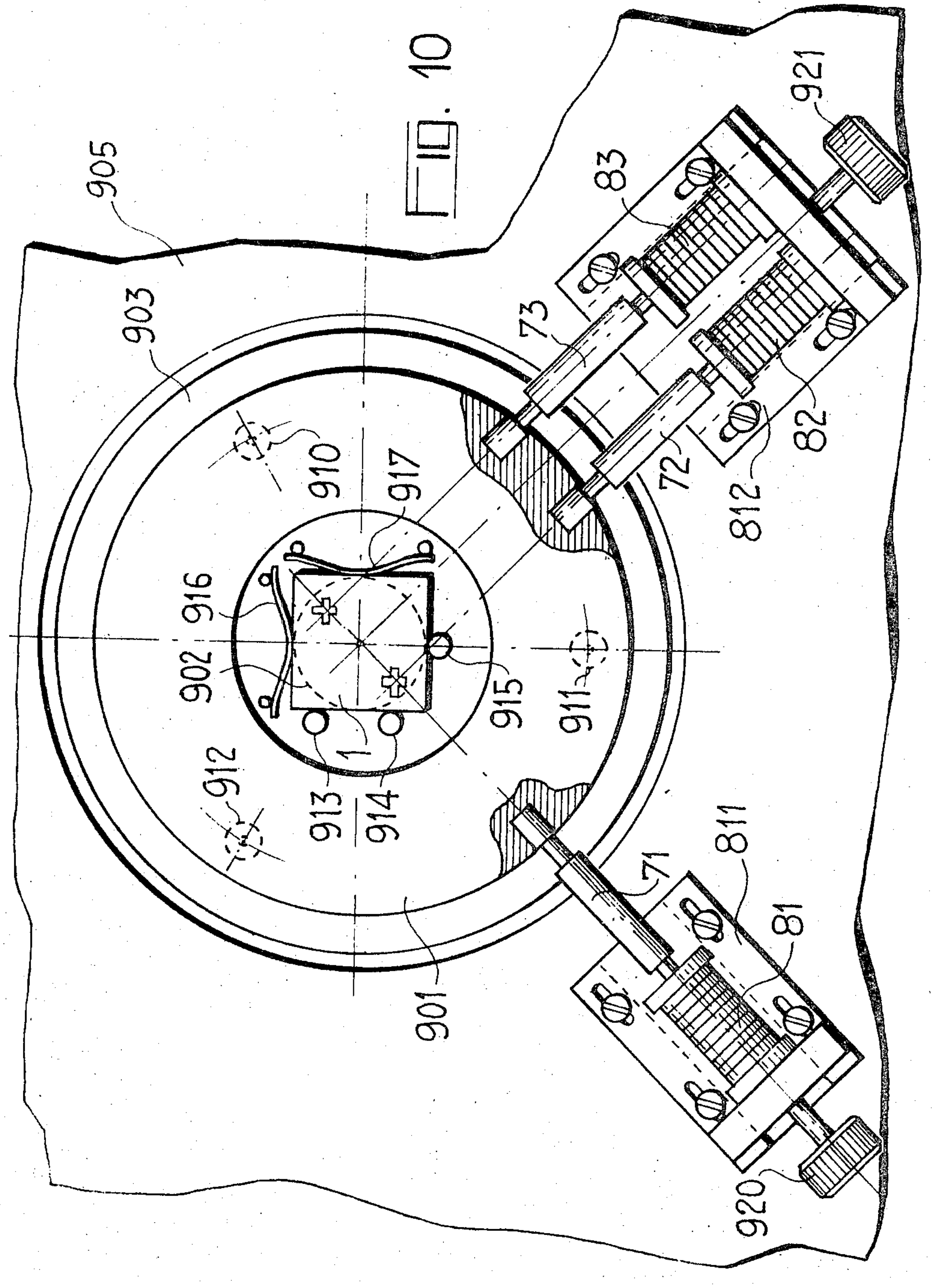
Figure 11:
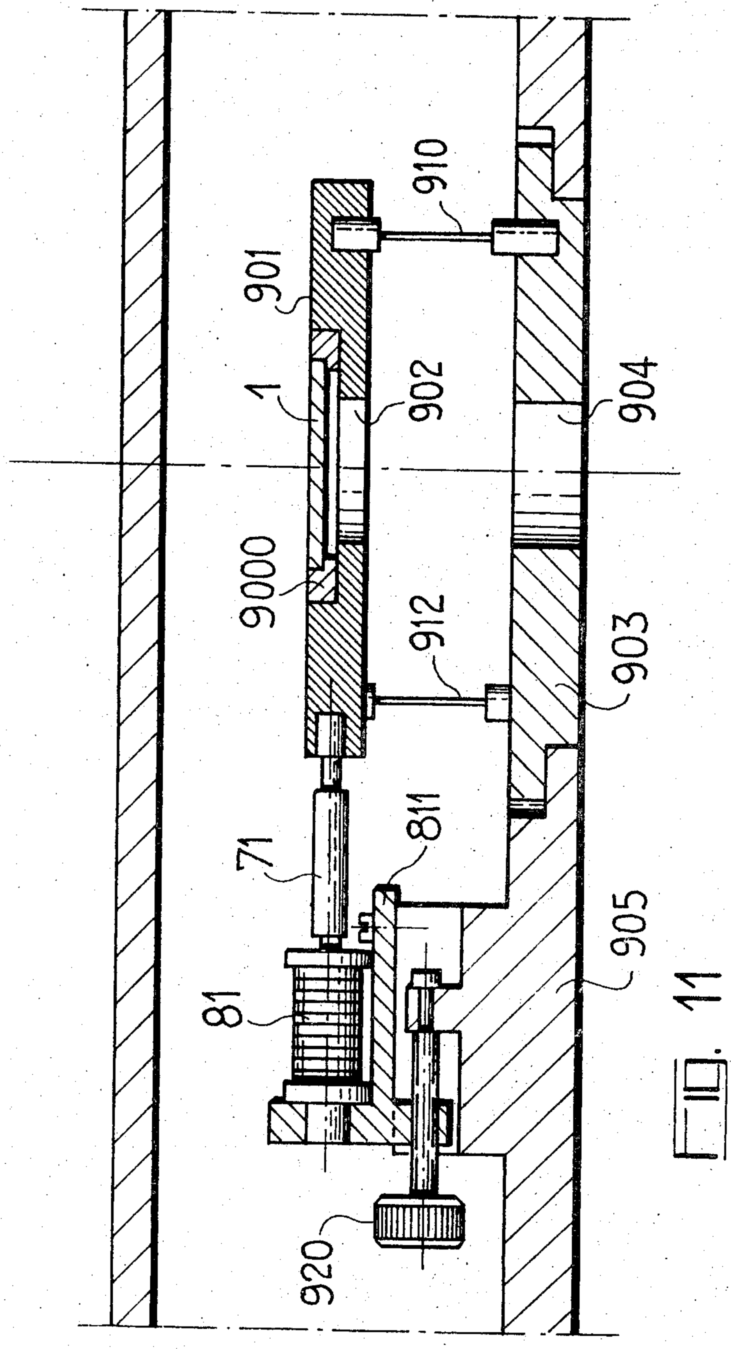
Figure 12:
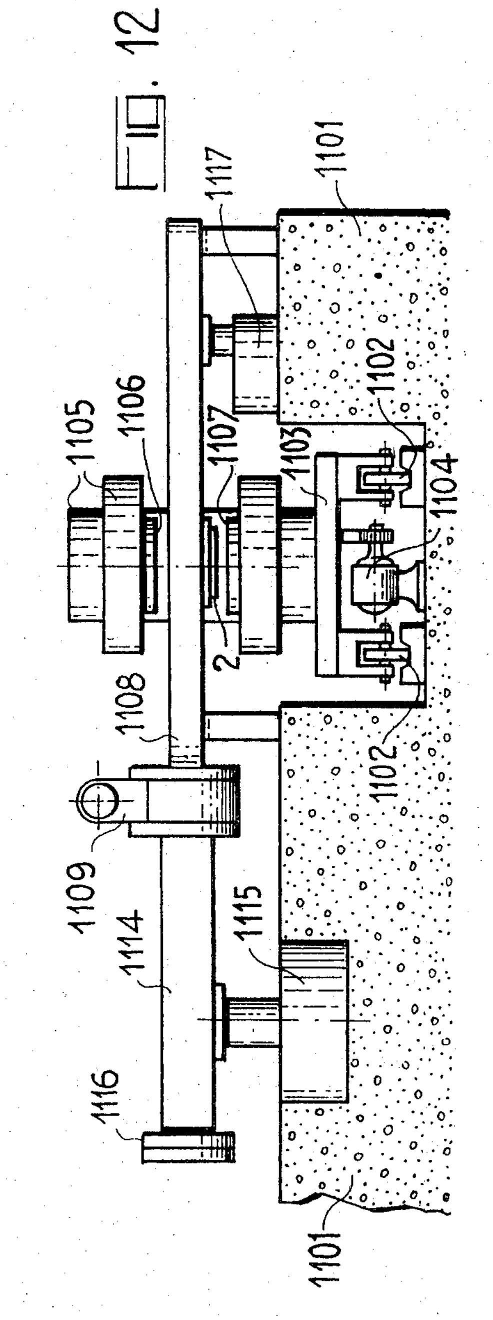
Figure 13:
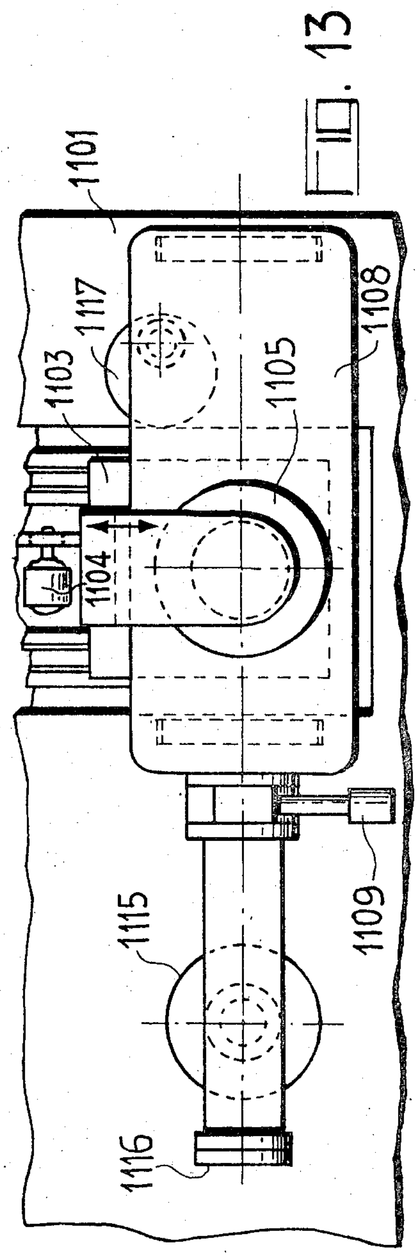
Figure 17:
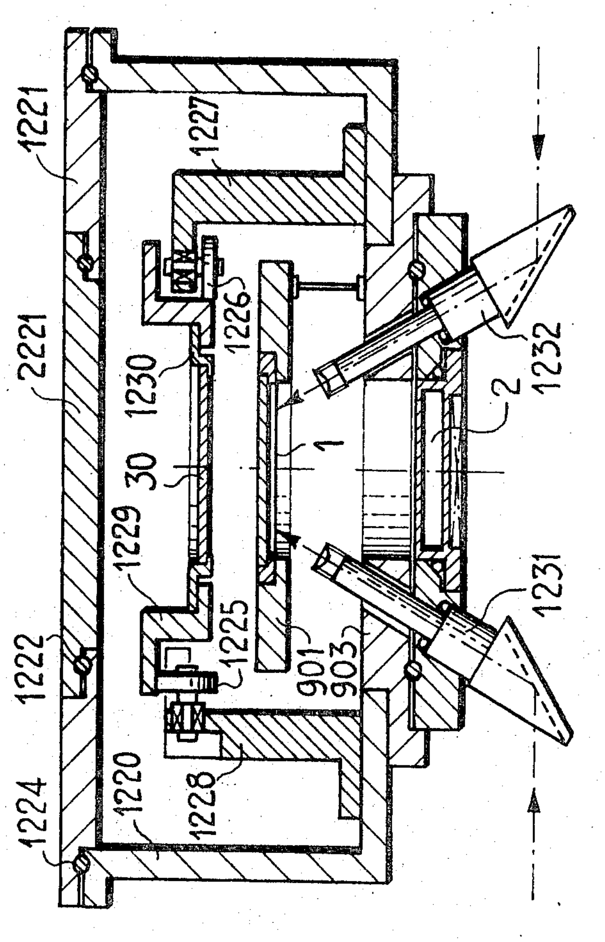
Figure 14:
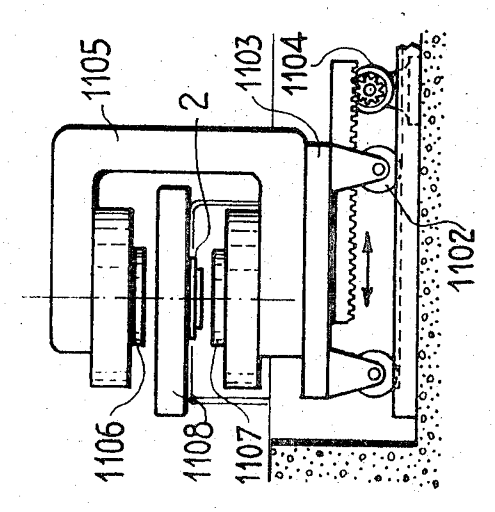
Figure 15:
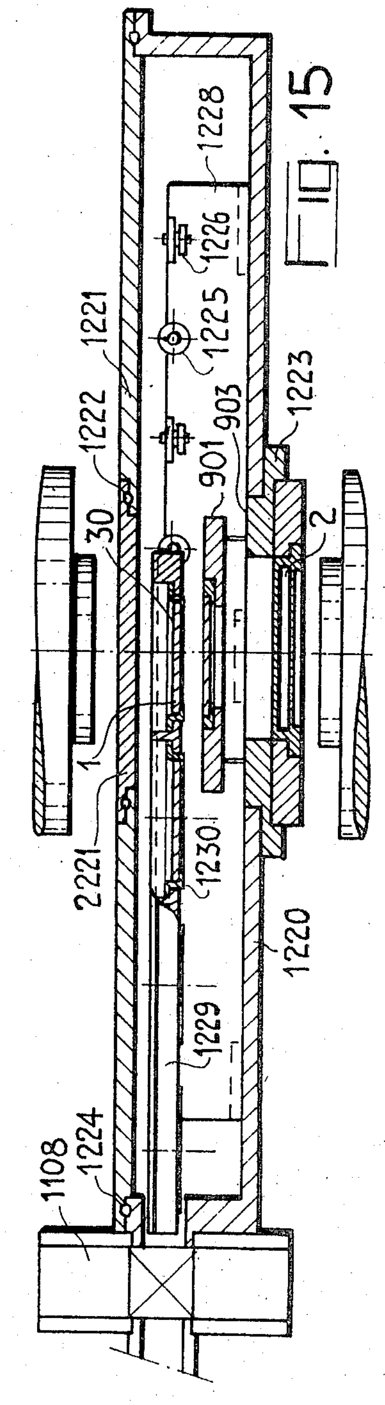
Figure 16:
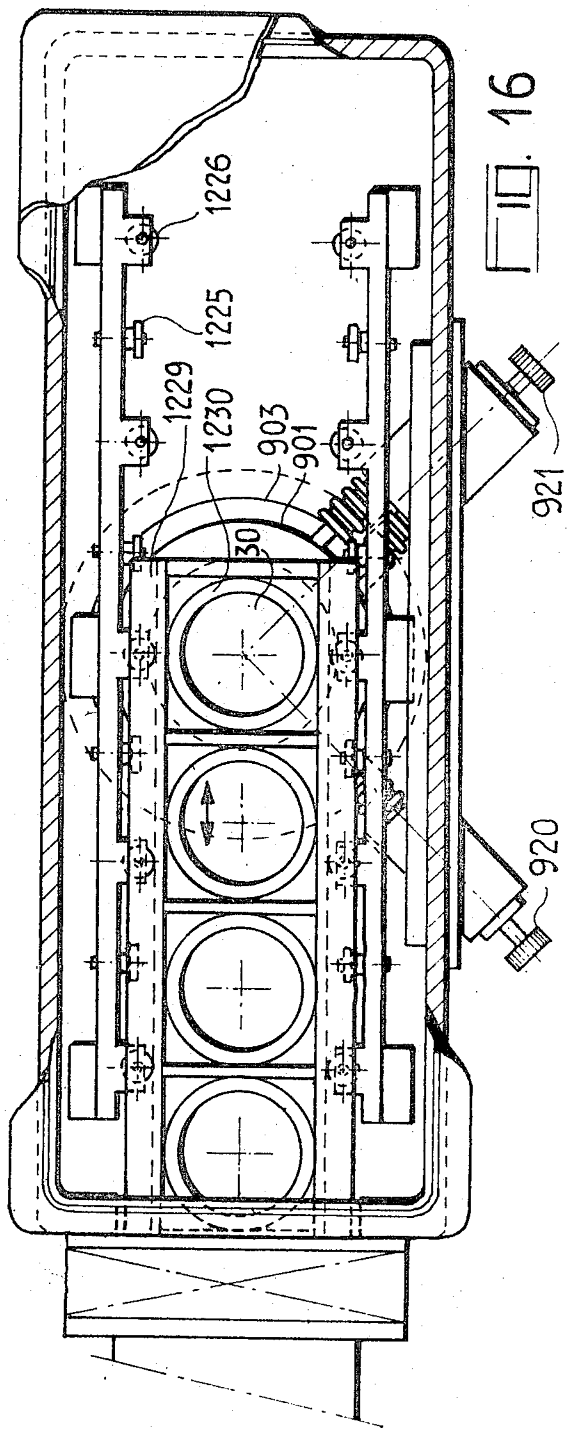

FIG. 8 schematically illustrates the action of the electromechanical circuits;

FIG. 9 is an example of the associated electronic circuits;

FIG. 10 and FIG. 11 are respective plan and sectional views of an embodiment of the master mask carrier;

FIGS. 12, 13 and 14 are respectively sectional, plan and profile views of an embodiment of the apparatus in accordance with the invention;

FIGS. 15, 16, 17 are corresponding views of the evacuated chamber.

Figure 1:
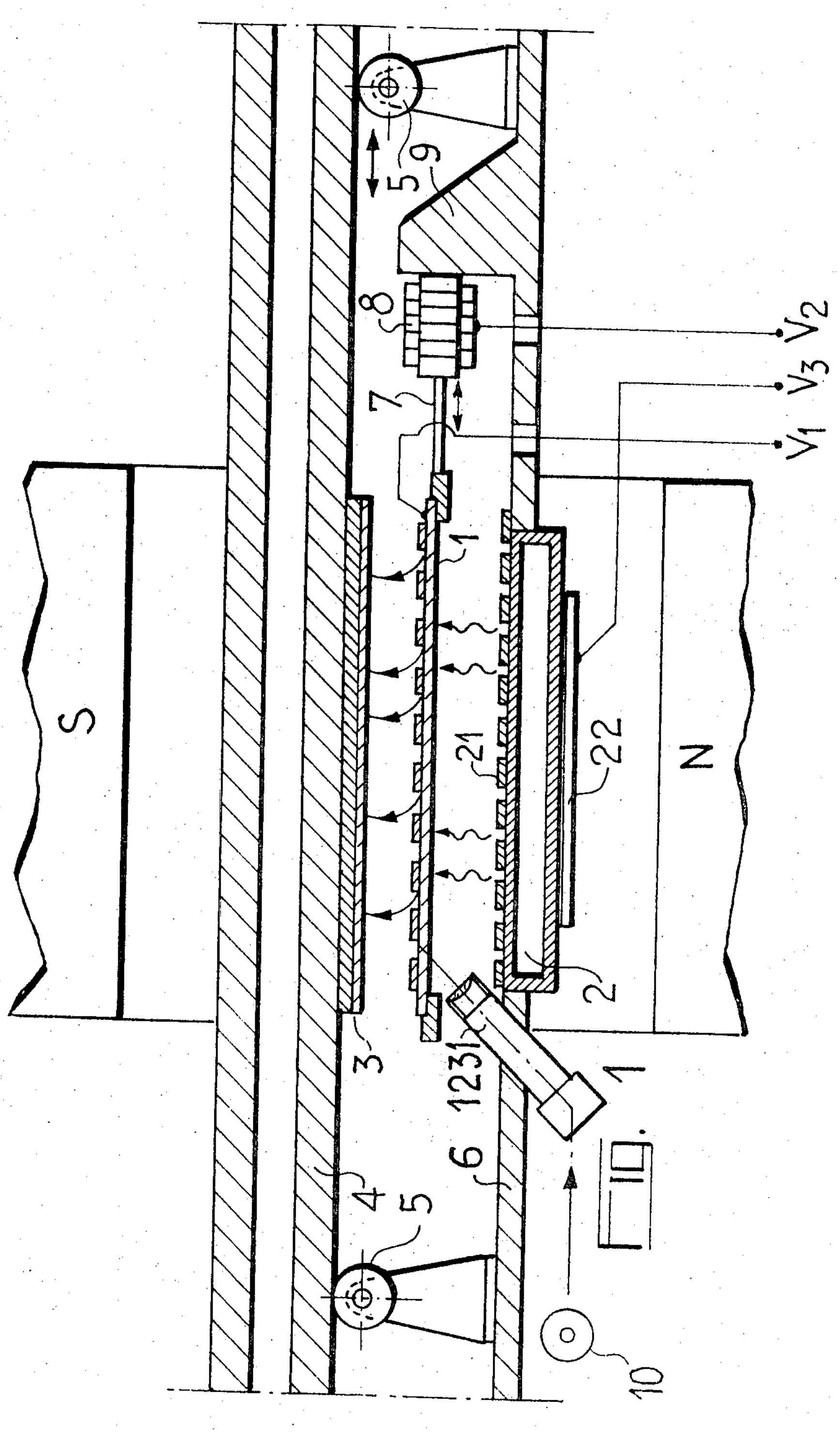
FIG. 1 illustrates in section schematically the device in accordance with the invention.

In FIG. 1, two polepieces S and N develop anuniform magnetic field in an evacuated chamber (illustrated in part only).

Figure 2:
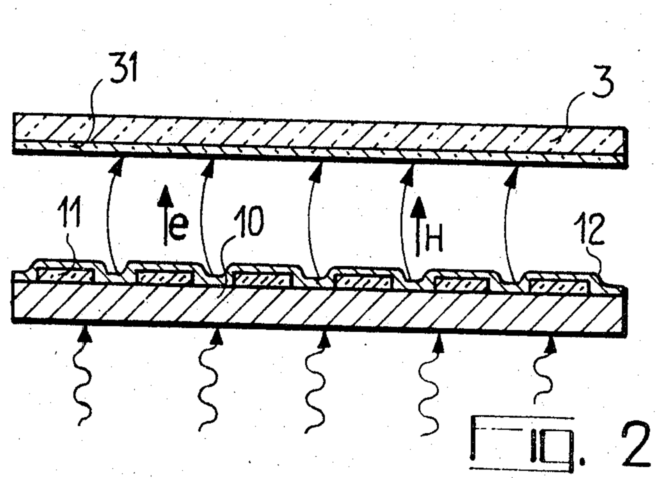
FIG. 2 illustrates in section the master mask and the wafer opposite it.

The master mask 1 is arranged in said evacuated chamber and, as FIG. 2 shows, comprises a quartz plate 10.

On one of the faces of this plate, by the methods indicated hereinbefore, the pattern of the mask has been deposited in the form of an opaque layer of titanium oxide 11, followed by a palladium layer 12 (FIG. 2). The mask is subjected to the radiation from a lamp 2 emitting diffuse ultraviolet radiation. To this end, on the wall of the lamp an opaque conductive grid 21 has been deposited opposite said master mask. This opaque grid constitutes one of the two electrodes between which the alternating voltage $V_3$ used to supply the lamp, is applied.

On the other side of the master mask, in relation to the lamp that is, there is deposited at a position fixed by wedges which have not been shown the wafer 3 which is to be printed.

This wafer is covered at the side facing the master mask, with a film 31 of suitable resin (FIG. 2).

A potential difference in the order of approximately 10 kV is applied between the master mask and the wafer. The latter rests upon a metal plate 4 which is displaced by means of rollers 5 fixed to a wall 6 of the evacuated enclosure.

The assembly is completed by a set of bars 7 only one of which has been shown. This bar is attached to the end of a stack 8 of piezoelectric ceramics whose length is adjusted by means of a control voltage applied via terminal $V_2$.

This stack has its other end fixed in a shoulder 9 of the frame(not shown) of the assembly. Lamps 10, only one of which has been shown, are used to illuminate an indexation mark located on the master mask, through the medium of an optical device 1231.

In order to understand the operation of the system, two operations will be successively considered, these two operations taking place in the reverse order to that in which they are described.

A. Transfer of the design of the master mask onto the wafer:

This master mask is assumed to be perfectly positioned in relation to the wafer. This operation therefore takes place after the positioning one which will be described hereinafter.

An alternating potential of 100, V, 50–60 MC/s, is applied to the electrode 22 of the ultra-violet lamp. The latter, thanks to the grid electrode 21, emits a diffuse radiation which is received by the quartz plate. This radiation illuminates those parts of the palladium layer located over the holes formed in the titanium oxide layer. The palladium layer, in response, emits electrons which, under the combined action of the two parallel fields, the electric one E created by the potential difference of 10 kV and the magnetic one H created by the magnet NS, and as a consequence of the transverse component of their initial velocities, follow well-defined helical trajectories and therefore are incident upon precisely defined points on the resin film.

The resin which is sensitive to electron bombardment, is thus printed at the points of electron impact. It is then polymerised at these points. The combined action of the two uniform fields is the same throughout all zones of the mask. All aberration is eliminated and the image on the wafer is identical to that of the mask.

B. Positioning the master mask

Figure 3:
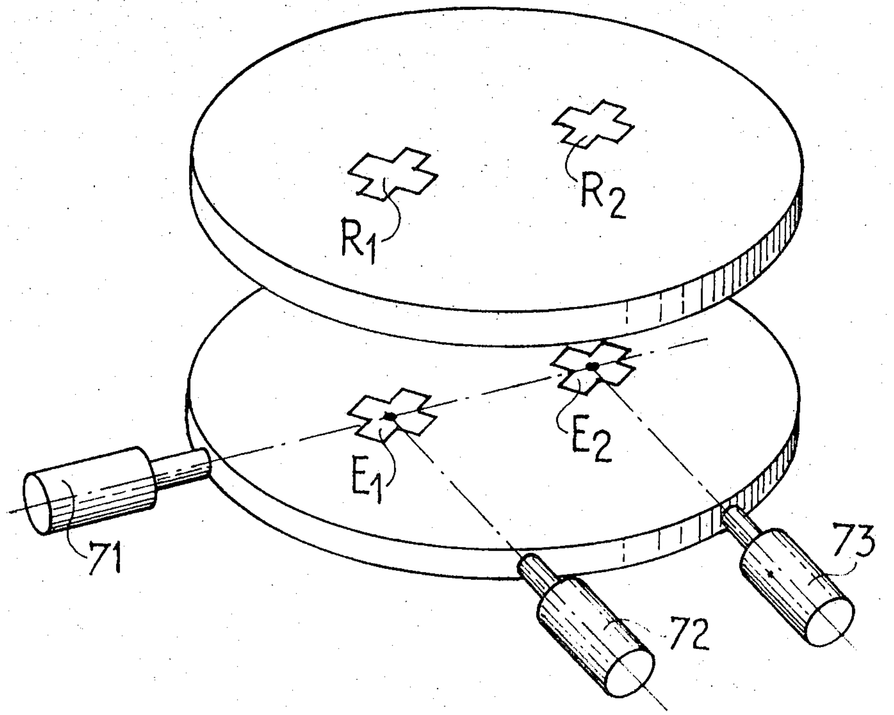

The problem is to place the centre of the master mask opposite the centre of the wafer and to rotate it in relation to the latter in order to achieve complete superimposition of the master mask and the wafer. Three parameters have to be taken into account, namely the two parameters of mask centre position which are associated with the plane of the master mask, this plane having to remain fixed during the displacement in order to keep the electric field which accelerates the electrons fixed, and an angular parameter $\theta$ in order to obtain appropriate orientation of the master mask in this plane. To this end, the master mask and the wafer each carry two indexation marks. All these masks have a completely identical form and identical dimensions, which are visible in the perspective illustration of FIG. 3.

It will be hereinbelow described what technology is used in the manufacture of the marks E1, E2 of the master mask, and those R1, R2 of the wafer. On both master mask and the wafer, the marks are disposed symmetrically in relation to the centre of symmetry. These marks are, for example, in the form of a cross.

Three bars 71, 72, 73 respectively subjected to the action, of piezoelectric elements 81, 82, 83 which have not been shown in this figure, are disposed in the following manner:

The bar 71 is aligned with the centres of the marks E2 and E1.

The bars 72 and 73 are perpendicular to the first and are directed towards the centre of the marks E1 and E2 respectively. Possible embodiments of the marks R1 and R2 have been shown in section in FIGS. 5, 6 and 7. The shape and sizes of the marks R1 and R2 of the wafer, are identical to that f the marks E1 and E2.

In the cases hereinbelow described, the silicon wafer 100 for printing, generally carries a film 101 of silica $SiO_2$.

Figure 5:
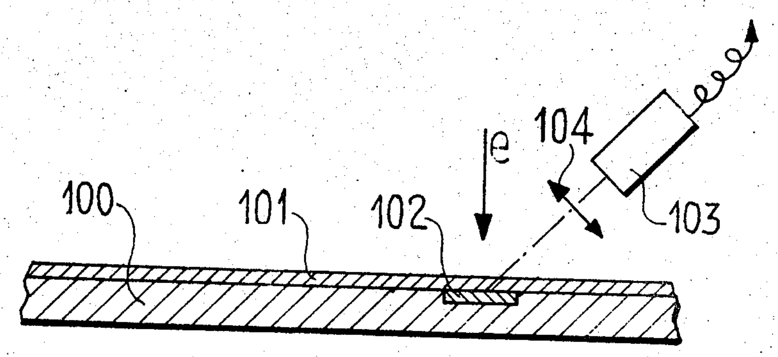
Figure 6:
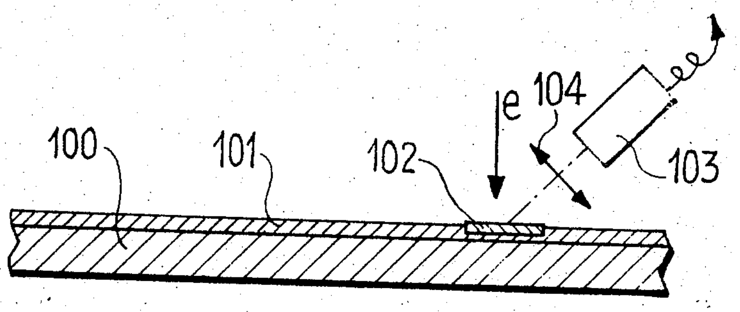

In FIGS. 5 and 6, the mark is a cathodo-luminescent film 102 implanted at the silica-silicon junction or on the silica film. Under the impact of electrons coming from the master mask marks, this film emits visible light whose intensity is a function of the electron flow received per unit area. In order to reduce the background noise, the wavelength of this light should be as far as possible from the spectrum line 253.7 nm of the mercury which is used to excite the photo-emissive material of the master mask.

These cathodoluminescent zones can be produced, for example, by the implantation of rare earth ions, which have the property, when encountered in small proportions in a solid, of having well defined spectrum emission lines. These rare earth ions are extremely heavy (atomic weight higher than 150). The depth of implantation is therefore any small. They can either be implanted, as FIG. 6 shows, in the silica or in the silicon, as shown in FIG. 5, the silica being transparent to the visible cathodoluminescent radiation. An optical system 104, in both these cases, directs the light rays onto a photo-mutliplier 103 which, in response, produces an electrical signal whose purpose will be described hereinafter.

Figure 7:
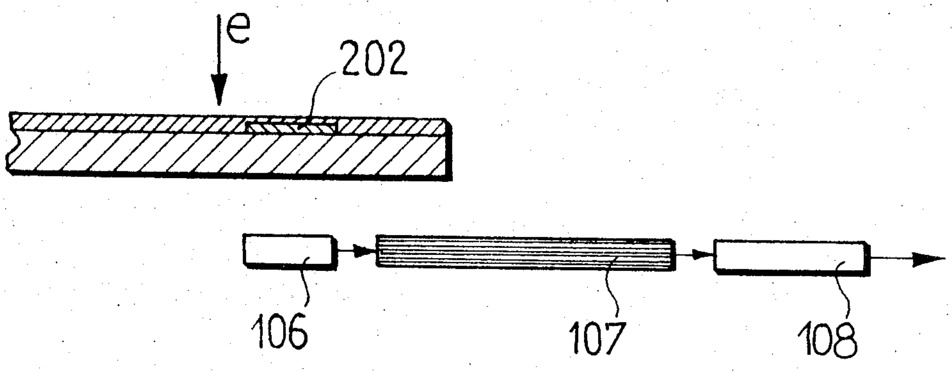

In FIG. 7, the indexation mark 202 is arranged between the silicon and the silica, or upon the silica itself. It is a thin film of refractory metal or metal oxide, capable of emitting x-rays when subjected to bombardment by electrons of sufficient energy. For a characteristic spectrum line of the material to be appropriately excited, it is necessary that the energy of the incident electrons is at least equal to double that of said characteristic spectrum line.

The metal will therefore be chosen as a function of the energy of its characteristic spectrum line, of the facility with which it can be detected, of its refractory properties, and of its resistance to chemical attack.

The marks will, for example, for constituted by a thin film of tantalum 2 to 3,000 angstroms in thickness. The bombardment energy will be in the order of 20 Kev, the characteristic spectrum line having an energy of 8 to 9 Kev.

The emitted radiation is picked up, for example, by a sodium-iodide scintillator 106 arranged behind the sample. Thus, the emitted radiation must have adequate energy to pass through the thickness of the sample without too much attenuation. The pulses produced by the scintillator are supplied through optical fibres 107 to a photo-multiplier 108.

The electrical signal produced by these three devices will have its maximum when the two marks E1 and R1 coincide. Since two identical devices are associated with the marks E2 and R2, an electrical signal will be produced which will have its maximum when these two marks coincide.

Figure 4:
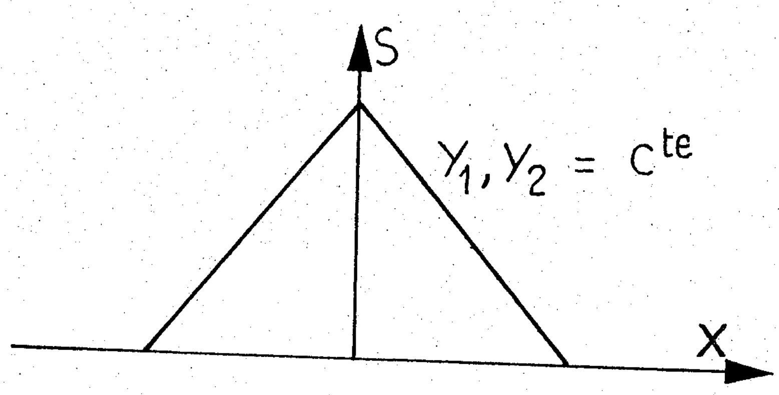

FIG. 4 illustrates, as a function of X, being the abscisse value of the end of the bar 71 (the bar 72 and 73 being fixed), the variations in the amplitude of the signal produced by one of the marks.

This signal has a sharp peak when the centre of the mark E1 coincides with the centre of the mark R1.

Two identical curves for Y1 and Y2, then variables, will be obtained, X being fixed.

the curve is substantially constituted by two rectilinear slopes disposed symmetrically to one another.

FIG. 8 is a plan view of the marks E1, E2, R1, R2, before alignment. The alignment operation takes place in the following fashion, in a successive way:

A. The mark R1 is the only one illuminated

A first series of translational operations, by actuation of the bar 71, brings the two centres of E1 and R1 onto the same line perpendicular to the axis $OX_0$, this being the axis containing the centres of R1 and R2, to within 1 $\mu$u.

Following the first series of operations, a first maximum in the output signal from the photoelectric transducer will have been obtained.

A second series of operations under the same circumstances, on the bar 72, will rotate the master mask about the centre of E2.

The output signal will then be at a maximum when the centres of E1 and R1 coincide to within 1 $\mu$u.

B The mark R2 is then the only one illuminated.

The bars 71 and 72 are not actuated this time. A series of operations of the bar 73 will cause the master mask to rotate about the centre of E1.

At the end of this third series of operations, the centres of R1 E1, E2 R2 will coincide with an accuracy of 1 $\mu$u.

A fresh set of operations identical to those already described. will produce successive displacements of 0.1 $\mu$u. following this second set of operations, the master mask will be positioned to within 0.1 $\mu$u in relation to the wafer.

FIG. 9 illustrates the diagram of an electronic circuit which is capable of carrying out these operations by a method which makes use of digital techniques.

A five-output S1, S2, S3, S7, S11 programmer 1001 is used. Through the outputs S1 and S2, it triggers the successive illumination of the lamps 1041 and 1042 respectively corresponding to the marks R1 and R2 illuminating the emitters E1 and E2 of the master mask 1. Through its output S3, it starts a clock 1002 which sets into motion a counter 1003 and stops the latter at the end of a fixed time T. This counter counts the pulses coming from the scintillator 1061 associated with the receiver R1, or that 1062 associated with the receiver R2 (case shown in FIG. 6).

At the end of each counting operation the counter 1003 supplies the output digits to a digital register 1004.

The outputs of the counter 1003 and the register 1004 are supplied to the two inputs E1 and E2 of a comparator 1005. which has three outputs S4, S5 and S6.

The output S4, which is actuated when it registers a 0, triggers the programmer through an input E7. The outputs S5 and S6 are respectively excited when the count N2 of the counter 1003 is greater than the count N1 of the register, and when the count N2 is less than N1.

These latter two outputs are connected to the forward backward inputs E3 and E4, of a count up, countdown device 1006.

At the start of operations, the device 1006 registers a number M which is the code translation, for example in binary code, of the initial voltages V applied to the bars 81 an83. Through an output S7, the programmer operates a counter 1007 which produces numbers translating, in the same code, a value $\Delta$V corresponding to a voltage increment or decrement, giving the bars displacements of 1 $\mu$u or 0.1 $\mu$u.

These numbers are added to or substracted from the count reached by the count up, count down device 1006, depending upon whether it is the input E3 or the input E4, which is excited.

Through its output S11, the programmer operates a switch 1008 with one input E5 and three outputs S8, S9 and S10, each of which latter acts through a register (1071–1072–1073), belonging to a digital-analogue converter (1171–1172–1173), on the supply arrangements 1271, 1272, 1273, of the bars 81, 82 and 83.

The operation of the system is as follows:

The marker E1 is illuminated by the output S1 of the programmer. The clock is started. The scintillator 1061 produces a certain number N1 of pulses during the time T.

with the store registering the number 0 this time, the input E2 of the comparator is excited through the action of the counter 1003. At this instant, the count N1 is transferred to the store 1004 and the number $\Delta$N corresponding to $\Delta$V, is added to the count M of the counter 1006 which latter then reads M + $\Delta$M. This number is stored in the store 1071 and converted into a voltage by the converter 1171. The voltage V + $\Delta$V is applied to the piezoelectric system 81 and the bar 71 displaces the master mask by one micron. The counter 1003 reads a number N2; the preceding count N1 has meanwhile been transferred to the store 1004.

The counts N2 and N1 are compared. If N2 is larger than N1, operations are started again and the counter 1006 at this time, has a count corresponding to M + $\Delta$M, will receive a new increment and displays M + 2 $\Delta$M and so on and so forth, until the number $N_n$ displayed by the counter is smaller than the number $N_{n-1}$ recorded by the store. The centres of the markers E1 and R1 will then be approximately upon the same perpendicular to R1 – R2.

The programmer will then set the switch to its output S9.

Operations will continue and will result in the actuation of the bars 72 and then 73, through the medium of the corresponding piezoelectric systems, and then in the illumination of the marks R2.

The positioning operation will be carried out to within 1$\mu$u.

The operation will then be recommenced with new numbers $\Delta$M corresponding to voltage increments which produce displacements of 0.1 $\mu$u. It will be stopped when the new result has been obtained.

FIG. 10 illustrates in plan and FIG. 11 in elevation, an embodiment of the system used to fix the mask carrier in the apparatus. The master mask 1 is attached to a moving holder 901 at whose centre an opening 902 is formed to pass the ultra-violet radiation. This moving holder is integral with a fixed plate 903 through the medium of three pillars 910, 911, 912, of very small diameter, 911 being not shown in FIG. 11, which act as torsional and flexural springs, enabling the carrier to execute very small displacements in a plane which we can consider as fixed. The master mask 1 is positioned on said carrier by means of two stops 913, 914, arranged at one of its sides, and another 915 disposed at another side perpendicularly to said side. Springs 916 and 917 arranged at the remaining sides, apply the master mask againts the stops. A housing 9000 covers the system (not shown in FIG. 10). The bars 71, 72 and 73 are connected to the stacks of piezoelectric washers 81, 82, 83. The stack 81 is assembled upon a mounting 811, the two others on one and the same mounting 812. Knobs 920, 921 are provided for coarse adjustment of the position.

The overall apparatus is illustrated in section, plane and elevation, in FIGS. 12, 13 and 14 respectively.

A frame 1101, through the medium of rollers 1102, supports a frame 1103 which can displace parallel to itself. This displacement is controlled by a motor 1104. The frame 1103 carries the electromagnet 1105 and its polepieces 1106 and 1107. These polepieces surround the vacuum tight enclosure 1108 which is arranged in a fixed position on the frame 1101. This enclosure has an input airlock 1114 equipped with a pumping system 1115, and communicates with the evacuated chamber proper through a solenoid valve 1109. The airlock has an entry hatch 1116.

The evacuated chamber moreover comprises a pumping unit proper 1117, arranged on the frame 1101.

The evacuated chamber proper, is illustrated in more detail in FIGS. 15, 16 and 17 which show it respectively in longitudinal section, plan and transverse section. In these figures, references identical to those in earlier figures, designate identical elements.

The evacuated chamber has a housing 1220 closed off by a cover 1221 and its seal 1224. A hatch 2221 and its seal 1222, make it possible in a straightforward manner, after the moving of the electromagnet, to place the master mask on the carrier 901.

In the evacuated chamber, the horizontal rollers 1226, and vertical rollers 1225 attached to the plates 1237 and 1238, support and guide the slider 1229 upon which there are assembled the housings 1230 in which there are mounted the wafers for printing, one 30 of which is shown in position there.

The master mask is installed upon its moving carrier 904.

Outside the evacuated chamber the illuminating device 2 is arranged as well as the devices for illuminating the markers 1231 and 1232.

In the entry airlock, the slider 1229 is supported in the same fashion as in the evacuated chamber.

The slider is equipped with means (not shown) which make it possible to successively bring the wafers into a position such tht they can be printed by the master mask.

What we claim is:

1. An electronic apparatus for the mass production of masks for integrated circuits, comprising a vacuum tight enclosure, and in said enclosure: a master mask, means for emitting diffuse ultra-violet radiations illuminating said mask, the unmasked parts thereof emitting electrons in response, a wafer covered with resin sensitive to electron bombardment located in a plane parallel to that of said master mask, means for producing an electric field and a magnetic field which are parallel to one another, and perpendicular to the plane of said master mask, in order to focus said electrons on said wafer, means being provided for maintaining said wafer at predetermined location, electrically controlled mechanical means to make it possible to adjust with a predetermined degree of accuracy, the position of said master mask in relation to said wafer, and to compensate the lack of the focussing of said electrons on said wafer; said electromechanical means comprising two pairs of identical indexation marks respectively carried by said wafer and said master mask, means being provided to illuminate the two marks of said master mask, thus producing in response emission of electron currents towards said marks of said wafer, said marks of said wafer being constituted of zones implanted on said wafer, said zones being made of a material capable under the impact of electrons of emitting radiation, transducer comprising photomultipliers being provided for transducing said radiations into electrical signals, optical means being provided to direct said radiations onto said photomultipliers.

2. An apparatus as claimed in claim 1, wherein said electromechanical means comprise a mask holder, a first, a second and a third bar, said bars being situated in the plane of said mask holder, said first bar directed along the straight line passing through said centers of said marks, said second and said third bar, being perpendicular to said first bar, and being respectively directed towards said centers of said marks, and respectively associated with said bars, piezoelectric elements, each having a control input, and means for connecting said control input to variable direct current voltage source, the variations in the voltage applied to element associated with the first bar resulting in a translation of said mask holder, whilst the variation in the voltage applied to the elements associated respectively with said first and third bars, produce rotations about the marks with which they are aligned, an automatic control device being provided to successively adjust the three voltages to obtain the maximum of amplitude of said signal.

3. An apparatus as claimed in claim 2, wherein the marks of said wafer are constituted by cathodoluminescent zones implated in the wafer.

4. An apparatus as claimed in claim 1, wherein that the marks of said wafer are constituted by metal zones capable of emiting x-rays in response to the electron current, said transducer means comprising a scintillator which receives said x-rays, a photomultiplier, and light conductors being used to connect said scintillator to said photo-multiplier.

5. An apparatus as claimed in claim 1, wherein said magnetic field producing means comprise an electromagnet having two polepieces, located outside said vacuum tight enclosure, displacement means being provided in order to displace the electromagnet in relation to said enclosure and enable the latter to be dismantled.

6. An apparatus as claimed in claim 5, wherein said enclosure has an entry airlock through which it can be supplied with wafers.

7. An apparatus as claimed in claim 6, wherein a slider is provided, said wafers being arranged upon said slider which is displaceable and guided by rollers in performing its displacements.

8. An apparatus as claimed in claim 4, wherein said automatic control device comprises a programmer for insuring a sequential operation cycle.

9. An apparatus as claimed in claim 8, wherein the programmer of said automatic control circuit comprises two first outputs for the sequential operation of the illumination of the two marks of said wafer; an electronic circuit, comprising a counter in order to count the pulses coming from the two scintillators, said programmer having a first output to actuate a clock which starts said counter and stops it at the end of fixed duration, a register connected to said counter, in order to store in the register, the count recorded during said fixed duration time of the proceding sequence; a comparator having, two inputs connected respectively to the outputs of said register and said counter, and two first outputs respectively actuated, if the count recorded by said counter is greater or less than said count recorded by the register, and a third output connected to the programmer, said third output being actuated when the counts are identical; a count up, count down counter whose initial count is a coded form of the initial voltage applied to said elements associated with said bars, having an up input and a down input respectively controlled by said first and second outputs of said comparator, the programmer having an output connected to said up input of the count up, count down counter in order to sequentially supply it with trains of pulses whose number represents a coded form of said voltage increments, a switch controlled by said programmer and having one input which receives the current from said count up, count down counter, and three outputs, means comprising a register, a digital to analogue converter for connecting each output of said switch to said d.c. variable voltage source, connected to the control input of each element.

* * * * *